Patented Aug. 31, 1948

2,448,013

UNITED STATES PATENT OFFICE 2,448,013

PREPARATION OF β-AMINOPROPIONITRILE

Saul R. Buc and Jared H. Ford, Kalamazoo, Mich., assignors to The Upjohn Company, Kalamazoo, Mich., a corporation of Michigan No Drawing. Application December 26, 1944, Serial No. 569,920

3 Claims. (Cl. 260—465.5)

This invention relates to processes for the preparation of β-aminopropionitrile.

There is described in the United States Letters Patent 1,992,615 a process for making the said compound which shows (Example 1) reacting anhydrous liquid ammonia with acrylonitrile in the ratio of 1.25 moles of ammonia per mole of acrylonitrile at 90 degrees centigrade under pressure to produce the desired compound in a yield of about 12.5% of theoretical. Whitmore et al., 66 JACS 725, disclose the same reaction in the proportion of eight moles of anhydrous liquid ammonia per mole of acrylonitrile at 40 degrees centigrade to produce a 22 per cent yield. In both instances the major product of the reaction was the secondary amine, bis-(cyanoethyl)-amine. It is interesting to note that, while the patentees above mention water in a long list of "diluents" which may be present in their reaction mixture, they point out no advantage accruing to its presence and that Whitmore et al. specifically state the presence of water in the reaction mixture reduces the yield of β-aminopropionitrile.

We have now discovered a method of carrying out the foregoing reaction whereby yields as high as 82 per cent of theory of β-aminopropionitrile can consistently be obtained. Our process involves the use of aqueous ammonia (say from 10 to 70 per cent by weight of ammonia) preheated to a temperature in a range between about 60 degrees and 130 degrees centigrade and the introduction portion-wise or continuously of the acrylonitrile into the hot aqueous ammonia under the vapor pressure of the reactants at the temperature employed. The introduction of the acrylonitrile into the aqueous ammonia should be accomplished under conditions such that the ammonia is always present in the reaction mixture in molal excess over that theoretically required to produce the desired primary amine. Preferably, the ammonia is present in the ratio of at least two moles of ammonia per mole of acrylonitrile and the preferred ratio from a cost standpoint for the production of maximum amount of the primary amine from a given quantity of acrylonitrile is about four mole parts of ammonia per mole part of the nitrile. The preferred temperature range for carrying out the reaction is between about 90 degrees and about 130 degrees centigrade. The step of introducing the acrylonitrile into the hot ammonia is critical and we have demonstrated that the yields are nearly doubled by this procedure as contrasted with performing the process under otherwise similar conditions except that the ammonia is added to the acrylonitrile. Preferably the nitrile is introduced into the aqueous ammonia below the surface thereof.

The following examples illustrate the practice of our invention:

Example 1

There was placed in a one gallon capacity steel bomb twenty gram moles of ammonia as a 28 per cent aqueous solution and the solution was heated to a temperature of 90 degrees centigrade. In another bomb, there was placed two gram moles of acrylonitrile, this bomb being connected to a cylinder of hydrogen as a pressure source and communicating with the bomb containing ammonia in a manner such that the acrylonitrile could be forced into the ammonia bomb by the hydrogen pressure, as desired. The acrylonitrile was forced into the ammonia bomb and introduced beneath the surface of the aqueous ammonia at a substantially uniform rate over a period of about 1 minute. When all of the acrylonitrile had been introduced into the ammonia, the reaction mixture was allowed to stand for two minutes and the charge was then blown out through an outlet tube that extended to the bottom of the bomb. The reaction mixture was distilled on a steam bath under reduced pressure to remove water and ammonia and the residual liquid then transferred to a Claisen flask and distilled under 5–8 millimeters absolute mercury pressure to separate β-aminopropionitrile and the secondary bis-(cyanoethyl)-amine. Substantially all of the acrylonitrile was recovered as the primary or secondary amine, of which 78.3 per cent was β-aminopropionitrile and 21.7 per cent was the secondary amine.

Example 2

Example 1 was repeated, utilizing eight gram moles of ammonia as a 28 per cent aqueous solution, yielding 66 per cent of β-aminopropionitrile and 34 per cent of the secondary amine.

Example 3

In another repetition of Example 1, utilizing four gram moles of ammonia as a 14 per cent aqueous solution and a temperature of 99 degrees centigrade, a yield of 64.1 per cent of β-aminopropionitrile and 35.9 per cent of the secondary amine was obtained.

Example 4

Another repetition of Example 1, utilizing four gram moles of ammonia as a 43 per cent aqueous solution and a temperature of 115 degrees centigrade, gave 74.2 per cent of β-aminopropionitrile and 25.8 per cent of the secondary amine.

Example 5

In a still further repetition of Example 1, twelve gram moles of ammonia as a 28 per cent aqueous solution and a temperature of 112 degrees centigrade were utilized. Under these conditions the yield was 82.2 per cent of β-aminopropionitrile and 17.8 per cent of the secondary amine.

Example 6

In another repetition of Example 1, utilizing three gram moles of ammonia as a 28 per cent aqueous solution at a temperature of 103 degrees centigrade, 63.1 per cent of β-aminopropionitrile and 36.9 per cent of the secondary amine were obtained.

Example 7

Under the conditions of Example 1, utilizing two gram moles of ammonia as a 28 per cent aqueous solution and a temperature of 98 degrees centigrade, the yields were 53.7 per cent of β-aminopropionitrile and 46.3 per cent of the secondary amine.

Example 8

In a repetition of Example 1, utilizing an equimolar ratio of ammonia as a 28 per cent aqueous solution and acrylonitrile and a temperature of 96 degrees centigrade, 32.4 per cent of β-aminopropionitrile and 67.6 per cent of the secondary amine were obtained.

We claim:

1. The method for the preparation of β-aminopropionitrile which includes: introducing acrylonitrile into aqueous ammonia maintained at a temperature in the range between about 60 degrees and about 130 degrees centigrade in amount such that the ammonia in the reaction mixture is always in molar excess.

2. The method for the preparation of β-aminopropionitrile which includes: introducing acrylonitrile into aqueous ammonia maintained at a temperature in the range between about 60 degrees and about 130 degrees centigrade in amount such that the ammonia in the reaction mixture is always present in the ratio of at least four mole parts of ammonia per mole of acrylonitrile.

3. The method for the preparation of β-aminopropionitrile which includes: introducing acrylonitrile into aqueous ammonia below the surface thereof, said ammonia being maintained at a temperature in the range between about 60 degrees and about 130 degrees centigrade, in amount such that the ammonia in the reaction mixture is always in molar excess.

SAUL R. BUC.
JARED H. FORD.

REFERENCES CITED

The following references are of record in the file of this patent:

UNITED STATES PATENTS

| Number | Name | Date |
| --- | --- | --- |
| 1,992,615 | Hoffman et al. | Feb. 26, 1935 |
| 2,195,974 | Reppe et al. | Apr. 2, 1940 |
| 2,335,997 | Carlson et al. | Dec. 7, 1943 |

OTHER REFERENCES

Engel et al., Beilstein (4th ed., 1st suppl., 1929), vol. 4, page 504.

Bruylants, Beilstein (4th ed., 2nd suppl., 1942), vol. 4, page 834.

Bruylants, Bull. Soc. Chim. Belg., vol. 32, pages 256–259 (1924).